(No Model.)
E. THOMSON.
ELECTRIC METER.
No. 532,839.  Patented Jan. 22, 1895.
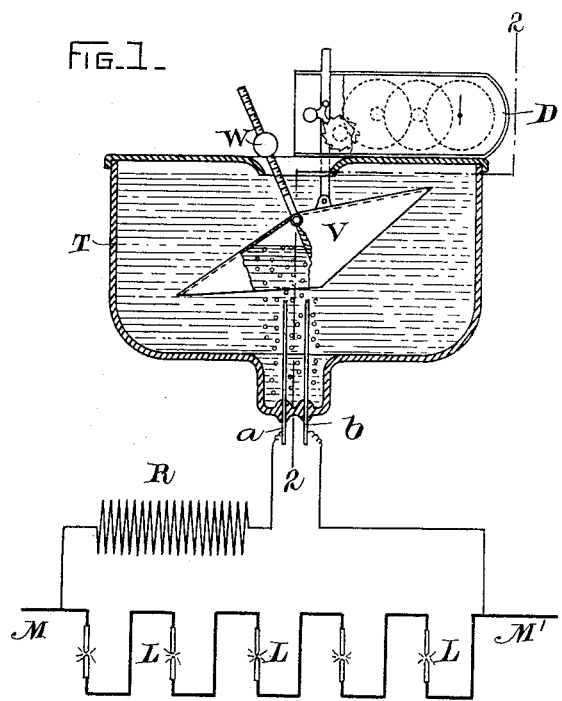
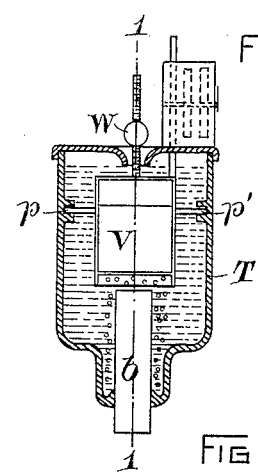
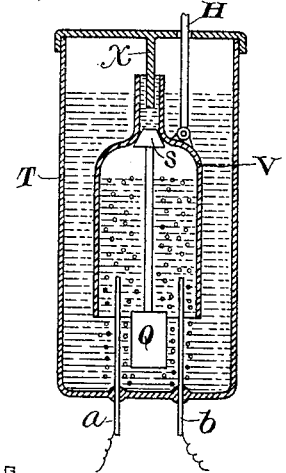
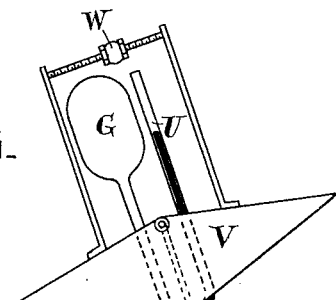
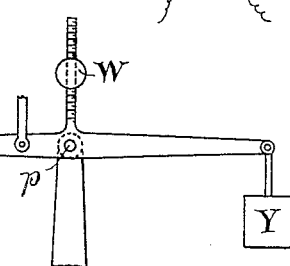
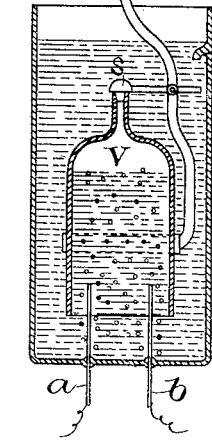
WITNESSES
A. F. Macdonald
E. W. Cady
INVENTOR
Elihu Thomson, by
Geo. R. Blodgett
Atty.

UNITED STATES PATENT OFFICE.

ELIHU THOMSON, OF SWAMPSCOTT, ASSIGNOR TO THE GENERAL ELECTRIC COMPANY, OF BOSTON, MASSACHUSETTS.

ELECTRIC METER.

SPECIFICATION forming part of Letters Patent No. 532,839, dated January 22, 1895.

Application filed August 10, 1894. Serial No. 519,949. (No model.)

*To all whom it may concern:*

Be it known that I, ELIHU THOMSON, a citizen of the United States, residing at Swampscott, in the county of Essex, State of Massachusetts, have invented certain new and useful Improvements in Electric Meters, of which the following is a specification.

My invention relates to electric meters, and has particular reference to those depending upon electrolytic action. It has also particular application to arc light circuits, where the lamps are run in series; and has for its object to produce a simple and accurate metering device for such circuits, upon which the potential required for electrolysis will have an unimportant effect; that is to say, the registration upon circuits where the potential is so high compared to that at which water decomposes, that this latter potential will not affect the metering devices sufficiently to require a correction. To attain the ends pointed out, I organize my meter as practically a registering volt meter responding mainly to the variations in the voltage to be measured; and in the case of arc lamps in series, to which it is particularly adapted, as above pointed out, I take a shunt around a number of arc lamps through a resistance so high as to carry but a very small percentage of the current, (one per cent. or less by preference,) and in this high resistance circuit I intercalate electrodes separated by an electrolyte which the current between them decomposes, thus discharging gases the volume of which determines the amount of current, and which is automatically measured, as hereinafter pointed out.

To the apparatus briefly outlined I apply the principle of the over-set balance, or a balance supported below its center of gravity so that it will remain at rest only when tipped to one side or to the other of its central position, by which means I secure a positive registering action of the meter; and I also add certain compensating devices, more fully pointed out hereinafter, adapted to increase the accuracy of the meter by compensating for variations of temperature and the barometric pressure, which affect the volume of the gas discharged, and consequently the registration.

The drawings show an embodiment of my invention.

Figure 1 is a longitudinal section upon the line 1—1 of Fig. 2. Fig. 2 is a section upon the line 2—2 of Fig. 1. Figs. 3, 4 and 5 show variations and modifications.

In Fig. 1 M, M' represent a portion of an arc light circuit having lamps L, L, L, one or or more, which may be shunted by one or more switches, as usual. This may be a group of lamps lighting a store or building, a registry of the voltage of which is to be kept. A high resistance coil R, the resistance of which is made higher than the number of lamps around which it is placed, and also preferably made of some material the resistance of which increases moderately by increase in temperature, is used. In series with this are two electrodes $a$, $b$, carried into a vessel containing a suitable electrolyte, such as dilute sulphuric acid. The current which traverses the resistance R in shunt to the lamps L, L, L, passes through the electrolyte between $a$, $b$, and decomposes the water, giving oxygen and hydrogen at the poles. This causes bubbles of these gases to rise from the electrodes which are caught by two compartments of approximately the same shape in a vessel V, which is made to rock from side to side. This vessel is pivoted, as shown in Fig. 2, at the pivots $p$, $p'$ and is provided with a counter-weight W, so that when it is completely filled with fluid it is overset or overbalanced and therefore will not be in stable equilibrium, but will rest upon either side of its support. The gases from the electrodes $a$, $b$ rise and are caught in a compartment of the vessel V, as indicated, which is open at the bottom, the gas or gases accumulating until the floating power of the compartment is sufficient to cause the weight W to be thrown over to the other side of the center. At this moment the gases are discharged or allowed to escape upward through the mass of liquid in the receptacle T; but this movement brings the other compartment, in this case the right hand one, over the electrodes, and the filling process goes on as before until gas is collected in sufficient amount to cause the vessel to again tilt to its first position. This goes on so long as gas is evolved and stops when the evolution of gas stops, so that, if all the lights L, L, L, be shunted, the registry ceases. If but two of them be shunted there will remain three which will give a less registry in proportion, particularly as the resistance R is so high that the voltage of decomposition of water does not count in the process. Of course the vessel V is entirely immersed in the liquid; and its movements may by any suitable means be carried to the register D, consisting of a series of dials showing the number of oscillations.

The apparatus as thus constructed will be subject to certain errors, chiefly those due to variation of barometric height and to changes of temperature. A low barometer or an increase of temperature expands the gases which are evolved and causes an accelerated movement. This however is in part compensated for by the fact that if R is made of metal which increases in resistance by increase of temperature, then the effect is to diminish the current by such increase when the outside temperature rises, and so compensate for the acceleration of registry due to the expansion of the evolved gases in the vessel V. As changes due to variations in barometric pressure could not be compensated for in that way, in Fig. 3 I indicate a method of compensation for both variations, which consists in connecting to the vessel V a closed bulb G containing gas or air communicating with a U-shaped tube U containing a heavy liquid, like mercury. On increase in temperature the gas in G is expanded, forcing the mercury column down in one leg and up in the other leg of the tube U, the effect of which, if properly adjusted, is to raise the center of gravity of the vessel V and parts connected therewith taken as a whole. This oversets or overbalances the apparatus to a greater extent than before and it will require a larger volume of gas in the compartments of V to cause the tipping from one side to the other, thus compensating for the expansion of the evolved gas. In the same way a fall of the barometer would expand the gas in G and raise the column of mercury, compensating for the expansion of the evolved gas due to fall of atmospheric pressure.

In the particular arrangement illustrated in Fig. 3, the balance of the vessel V will be more or less disturbed by change of position of the mercury in the tube U, in accordance with the variations of temperature and pressure. This, however, does not effect the accuracy of registration, as it would only necessitate a slightly greater volume of gas in one side or the other of the vessel to effect its tipping. In practice, however, it will be found desirable to arrange the tube U substantially in the plane of the center of the vessel V in which the axis of rotation is also situated, although this is not essential to the correct operation of the device.

In Fig. 4 the outer vessel T contains electrodes $a$, $b$, as before, connected in circuit with a resistance, and these electrodes are in a small submerged bell, which, when empty of gas, sinks, and when the gas has accumulated therein to a sufficient extent, begins to rise or float. At the upper part is a stopper or valve $s$, which by a float Q is held shut until the containing vessel rises to a sufficient degree to bring the downwardly or projecting piece $x$ in contact with the valve $s$ at which moment the gas escapes by the opening of the said valve. In order to make this action positive, it is desirable that the vessel be carried upon an overset balance or lever, and a rod H is provided for attachment to such a lever, as shown in Fig. 5, it being so arranged that the center of gravity is above the point of support at $p$, whereby any tendency to rise is accentuated so that the valve $s$ is positively opened for the discharge of the gas, and when the gas is all, or nearly all, discharged, then and then only does the mechanism begin its return, after which the gas again collects and is again discharged, the oscillatory movements being recorded in any suitable way.

Fig. 5 also shows a further modification, in which the valve $s$ rests on top of the vessel V, which is like a bottle with the bottom cut off. This valve is so held as to make a secure joint; but upon a sufficient amount of gas accumulating from the decomposition at the electrodes $a$, $b$, the vessel V rises in the fluid in which it is submerged until the valve rod or lever connected with the valve $s$ strikes the stop $x$, opening the valve, and allowing the gas to escape; after which the valve closes and the vessel sinks again into the fluid. Positive action is brought about by the fact, as stated above, that the lever J is so arranged that its center of gravity is above the point of support; that is, the whole apparatus behaves as an overset balance which can only be at rest on one side or the other of its middle position. The amount of oversetting can be adjusted by a weight W such that a given amount of gas may be collected in V before any upward movement takes place. This upward movement will continue until the valve $s$ is opened and the vessel V will remain in its upper position until all the gas has been discharged from its interior, after which it will again sink.

Fig. 5 further indicates a method of partial compensation for changes in barometric pressure. The weight Y which is used as a counterbalance for the vessel V, may be made of solid metal and of as high specific gravity as possible, while there may be a vessel Z constructed of thin metal, as thin as practicable, which is to be exhausted of air. This vessel Z under changes of atmospheric pressure will be more or less buoyed or floated. When it is immersed in dense air it will be buoyed with a force equal to the air which it displaces, and when there is a fall of atmospheric pressure it will be buoyed with a less force in accordance with the difference of density. These actions will tend to compensate for the expansion of the gas in V when there is a fall of atmospheric pressure, and the condensation of such gas when there is a high atmospheric pressure.

Such an adjustment is made of the various compensating elements introduced in the apparatus as will secure a fair accuracy in the registration.

Many changes may of course be made in the particular arrangements pointed out. For instance, where the meter is to be used on constant potential circuits, it would be placed with its resistance in shunt to a predetermined resistance in the main circuit, and under such circumstances its registration would not be accurate on account of the loss in the resistance in the main circuit, which under heavy loads would become appreciable. Such changes, or other formal ones, I aim to embrace in the claims.

What I claim as new, and desire to secure by Letters Patent of the United States, is—

1. In an electric meter and in combination, a vessel containing an electrolyte, electrodes therein, a second vessel adapted to collect the gas from the electrodes and to release the same upon a definite accumulation, and means adapted to vary the action of the collecting vessel in accordance with variations of temperature, as herein set forth.

2. In an electric meter and in combination, a vessel containing an electrolyte, electrodes therein, a collecting vessel arranged over such electrodes adapted to collect the gas released thereby and to release the same upon a definite accumulation thereof, and means adapted to vary the action of the vessel in accordance with variations of barometric pressure, as herein set out.

3. In an electric meter and in combination, a vessel containing an electrolyte, electrodes therein, a collecting vessel immersed in the electrolyte arranged above the electrodes and adapted to collect the gas escaping therefrom and to release it upon a definite accumulation thereof, a support for the vessel arranged below its center of gravity, a registering train connected with the vessel adapted to register its movements, and means adapted to vary the times of action of the vessel to compensate for variations in temperature and atmospheric pressure, as herein set out and described.

4. In combination, a vessel containing an electrolyte, electrodes therein, a shunt to the main circuit including such electrodes, a resistance in such shunt circuit in series with the electrodes, a vessel immersed in the electrolyte arranged above the electrodes adapted to collect the gas escaping therefrom and to release it upon definite accumulation thereof, a support for the vessel below its center of gravity, and a registering train connected to the vessel adapted to register its movements, as herein set out.

5. In an electric meter, a vessel containing an electrolyte, electrodes therein, a shunt circuit including such electrodes, a resistance in the shunt circuit composed of material the resistance of which is adapted to increase by increase of temperature, a vessel immersed in the electrolyte and adapted to collect the gas escaping from the electrodes, such vessel having a support below its center of gravity, and a registering apparatus operated by the movements of the vessel.

6. As a means for varying the action of an electric meter, operating by electrolysis to accord with variations of temperature or barometric pressure, a hermetically sealed chamber and a weight adapted to oppose each other, as herein set out; whereby variations of pressure may cause a difference in the balance between the two and thus vary the times of action of the meter registering device, substantially as set out and described herein.

In witness whereof I have hereunto set my hand this 7th day of August, 1894.

ELIHU THOMSON.

Witnesses:
JOHN W. GIBBONEY,
WALTER S. MOODY.